US012646167B2

(12) United States Patent
Tsai

(10) Patent No.: US 12,646,167 B2
(45) Date of Patent: Jun. 2, 2026

(54) BIOLOGICAL NUMERICAL MONITORING AND FEATURE IDENTIFICATION ANALYSIS SYSTEM AND METHOD THEREOF

(71) Applicant: DROBOT BIOTECHNOLOGY LIMITED COMPANY, Taipei (TW)

(72) Inventor: I-Chen Tsai, Taipei (TW)

(73) Assignee: DROBOT BIOTECHNOLOGY LIMITED COMPANY, Taipei (TW)

( * ) Notice: Subject to any disclaimer, the term of this patent is extended or adjusted under 35 U.S.C. 154(b) by 365 days.

(21) Appl. No.: 18/228,688

(22) Filed: Aug. 1, 2023

(65) Prior Publication Data

US 2024/0046455 A1 Feb. 8, 2024

(30) Foreign Application Priority Data

Aug. 2, 2022 (TW) .................................. 111129036

(51) Int. Cl.
G06T 7/00 (2017.01)

(52) U.S. Cl.
CPC .. G06T 7/0012 (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 10,445,584 B2 | 10/2019 | Gu et al. | |
| 12,013,334 B2* | 6/2024 | Itoh | G01N 21/51 |
| 2009/0202108 A1* | 8/2009 | Faeldt | G06T 7/20 |
| | | | 382/128 |
| 2018/0332818 A1* | 11/2018 | Tsao | C12M 23/06 |
| 2018/0332842 A1* | 11/2018 | Tsao | C12M 41/48 |
| 2019/0113423 A1* | 4/2019 | Goodman | G06V 20/698 |

FOREIGN PATENT DOCUMENTS

| | | |
|---|---|---|
| CN | 100998491 A | 7/2007 |
| CN | 103598169 A | 2/2014 |
| CN | 107491773 A | 12/2017 |
| CN | 109145032 A | 1/2019 |
| CN | 112560621 A | 3/2021 |
| CN | 214896680 U | 11/2021 |
| TW | 201900015 A | 1/2019 |

* cited by examiner

*Primary Examiner* — Michelle M Koeth

(57) ABSTRACT

Disclosed are a biological numerical monitoring and feature identification analysis system and a method thereof. The method includes: shooting, by a first shooting module, a first lid connected to a tube body in a first culture tube from top to bottom to acquire a first image; shooting, by a second shooting module, a second lid separated from the tube body in the first culture tube from bottom to top to acquire a second image; and receiving, by a condition judgment module, the first image and the second image to respectively identify a plurality of first features and a plurality of second features of a target organism, and judging a health degree of the target organism in the first culture tube according to the plurality of first features and the plurality of second features of the target organism.

12 Claims, 5 Drawing Sheets

26

25

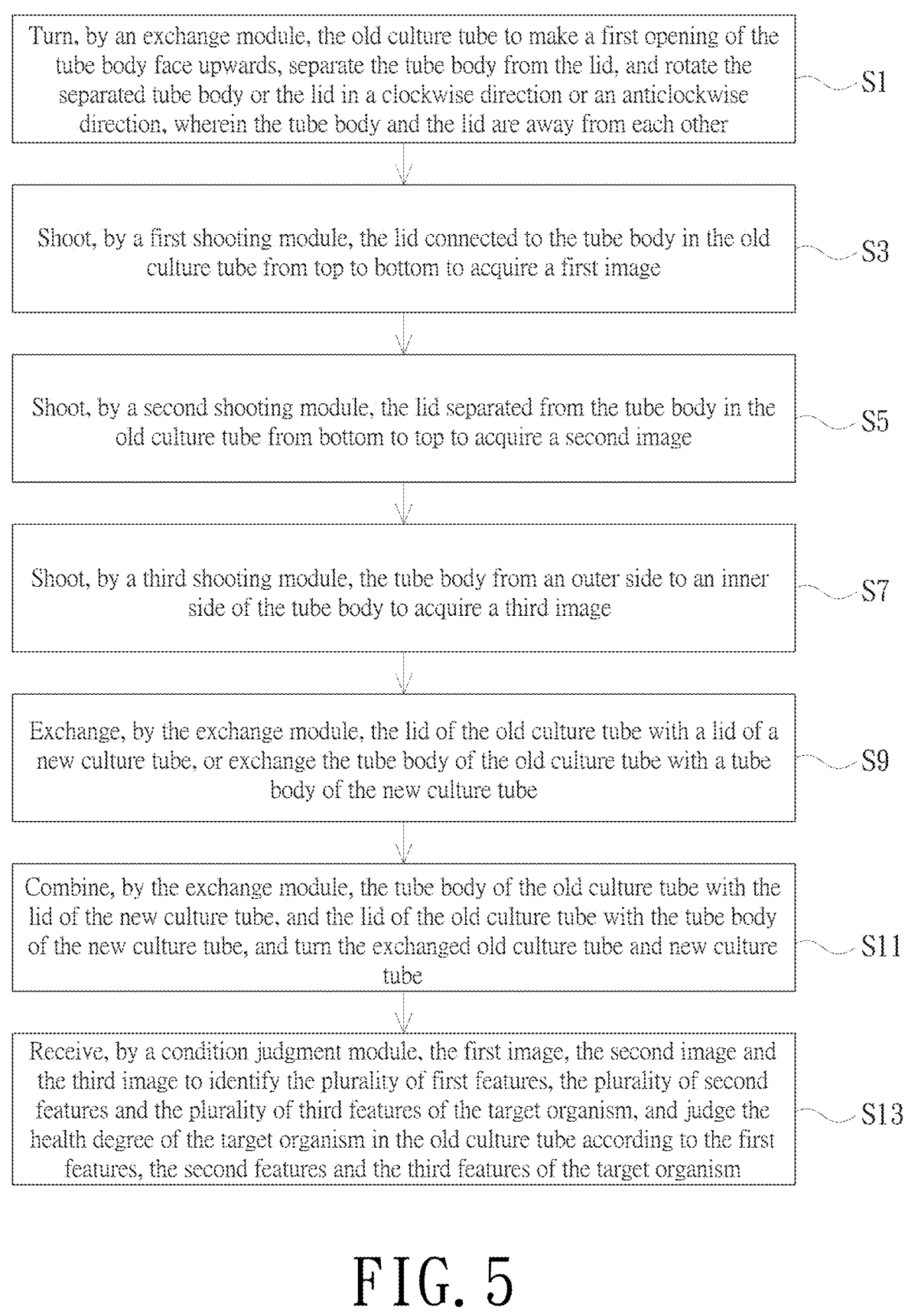

Turn, by an exchange module, the old culture tube to make a first opening of the tube body face upwards, separate the tube body from the lid, and rotate the separated tube body or the lid in a clockwise direction or an anticlockwise direction, wherein the tube body and the lid are away from each other　　S1

Shoot, by a first shooting module, the lid connected to the tube body in the old culture tube from top to bottom to acquire a first image　　S3

Shoot, by a second shooting module, the lid separated from the tube body in the old culture tube from bottom to top to acquire a second image　　S5

Shoot, by a third shooting module, the tube body from an outer side to an inner side of the tube body to acquire a third image　　S7

Exchange, by the exchange module, the lid of the old culture tube with a lid of a new culture tube, or exchange the tube body of the old culture tube with a tube body of the new culture tube　　S9

Combine, by the exchange module, the tube body of the old culture tube with the lid of the new culture tube, and the lid of the old culture tube with the tube body of the new culture tube, and turn the exchanged old culture tube and new culture tube　　S11

Receive, by a condition judgment module, the first image, the second image and the third image to identify the plurality of first features, the plurality of second features and the plurality of third features of the target organism, and judge the health degree of the target organism in the old culture tube according to the first features, the second features and the third features of the target organism　　S13

FIG. 5

BIOLOGICAL NUMERICAL MONITORING AND FEATURE IDENTIFICATION ANALYSIS SYSTEM AND METHOD THEREOF

FIELD OF THE INVENTION

The present invention relates to a biological identification system and method, and particularly relates to a biological numerical monitoring and feature identification analysis system and a method thereof.

BACKGROUND OF THE INVENTION

Fruit flies are known common organisms in biological studies and are usually cultured in tube bottles. In the process of culturing the fruit flies, in addition to periodical replacement of the tube bottles for culture to continue the protospecies of the fruit flies, it is further necessary to monitor the health condition of the fruit flies in the tube bottles, so as to prevent the tube bottles, together with the fruit flies, from being destroyed as the protospecies of the fruit flies are contaminated. However, there are many tube bottles for culturing the fruit flies. Although replacement and renewal of the tube bottles have been operated by a tube bottle replacement system, there is no means to monitor the health condition of the fruit flies in the tube bottles, and the health condition of the fruit flies in each tube bottle has to be observed manually, which not only consumes the manpower and the time cost, but also causes erroneous judgment. Therefore, it is necessary to provide a means to effectively monitor the health condition of the fruit flies in each tube bottle.

SUMMARY OF THE INVENTION

The present invention provides a biological numerical monitoring and feature identification analysis system and a method thereof, which, in addition to cooperation with a tube bottle replacement system, can monitor the health condition of the fruit flies in each tube bottle, so as to lower the manpower and the time cost, and avoid erroneous judgment.

The biological numerical monitoring and feature identification analysis method provided by the present invention is executed by the biological numerical monitoring and feature identification analysis system. The biological numerical monitoring and feature identification analysis method disclosed by the present invention includes: shooting, by a first shooting module, a first lid connected to a tube body in a first culture tube from top to bottom to acquire a first image; shooting, by a second shooting module, a second lid separated from the tube body in the first culture tube from bottom to top to acquire a second image; and receiving, by a condition judgment module, the first image and the second image to respectively identify a plurality of first features and a plurality of second features of a target organism, and judging a health degree of the target organism in the first culture tube according to the plurality of first features and the plurality of second features of the target organism.

The biological numerical monitoring and feature identification analysis system disclosed by the present invention includes a first shooting module, a second shooting module and a condition judgment module connected to the first shooting module and the second shooting module. The first shooting module is configured to shoot a first lid connected to a tube body in a first culture tube from top to bottom to acquire a first image; the second shooting module is configured to shoot a second lid separated from the tube body in the first culture tube from bottom to top to acquire a second image; and the condition judgment module is configured to receive the first image and the second image to respectively identify a plurality of first features and a plurality of second features of a target organism, and to judge a health degree of the target organism in the first culture tube according to the plurality of first features and the plurality of second features of the target organism.

By appropriately adopting the shooting modules in the tube bottle replacement system to monitor the health condition of the fruit flies, the system and method provided by the present invention can monitor the health condition of the fruit flies in each tube bottle, so as to achieve the functions of lowering the manpower and the time cost, and avoiding erroneous judgment.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 5 is a flowchart of a biological numerical monitoring and feature identification analysis method provided by an embodiment of the present invention.

DETAILED DESCRIPTION OF PREFERRED EMBODIMENTS

Figure 1:
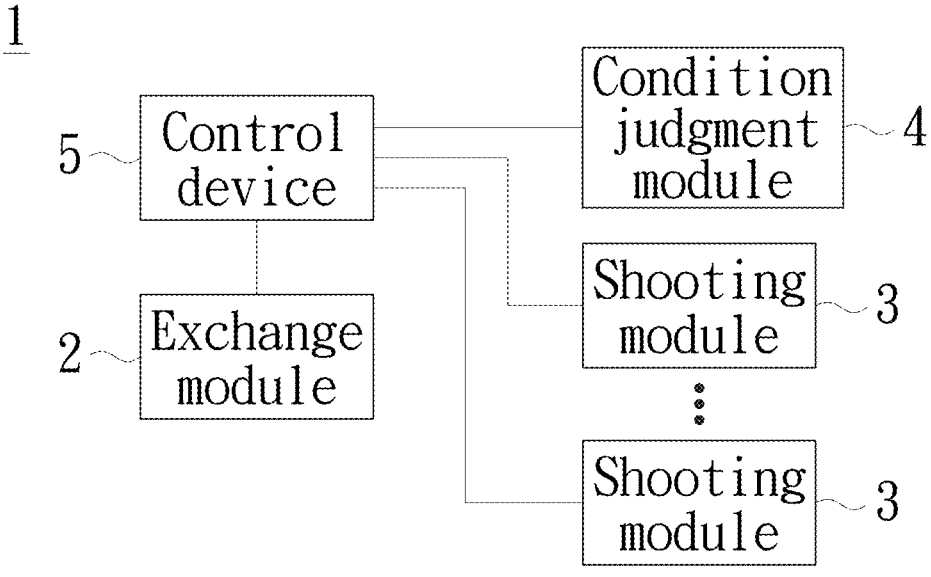
FIG. 1 is a schematic diagram of a biological numerical monitoring and feature identification analysis system provided by an embodiment of the present invention.

As shown in FIG. 1, FIG. 1 is a schematic diagram of a biological numerical monitoring and feature identification analysis system provided by an embodiment of the present invention. The biological numerical monitoring and feature identification analysis system 1 provided by the embodiment includes an exchange module 2, a plurality of shooting modules 3, a condition judgment module 4 connected to the plurality of shooting modules 3, and a control device 5 connected to the exchange module 2, the plurality of shooting modules 3 and the condition judgment module 4, wherein the exchange module 2 is configured to execute exchange of culture tubes, the shooting modules 3 are configured to shoot images of the culture tubes, the condition judgment module 4 is configured to judge the health degrees of target organisms in the culture tubes, and the control module 5 is configured to control the exchange module 2, the shooting modules 3 and the condition judgment module 4 to execute corresponding functions. In addition, the exchange module 2 can be a tool structure capable of rotating and stretching in multiple directions such as a mechanical arm and a production line tool, the condition judgment module 4 can be an artificial intelligence identification device or a circuit, and the control device 5 can be a processing circuit capable of executing operational capability such as a processor and a controller.

Figure 2:
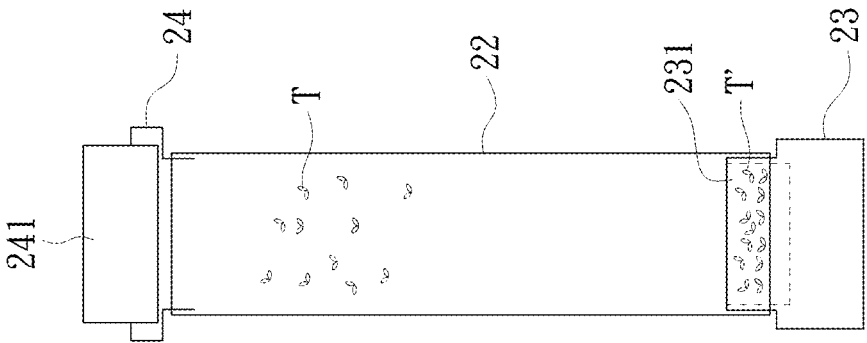
FIG. 2 is a schematic diagram of a culture tube provided by an embodiment of the present invention.
Figure 2:
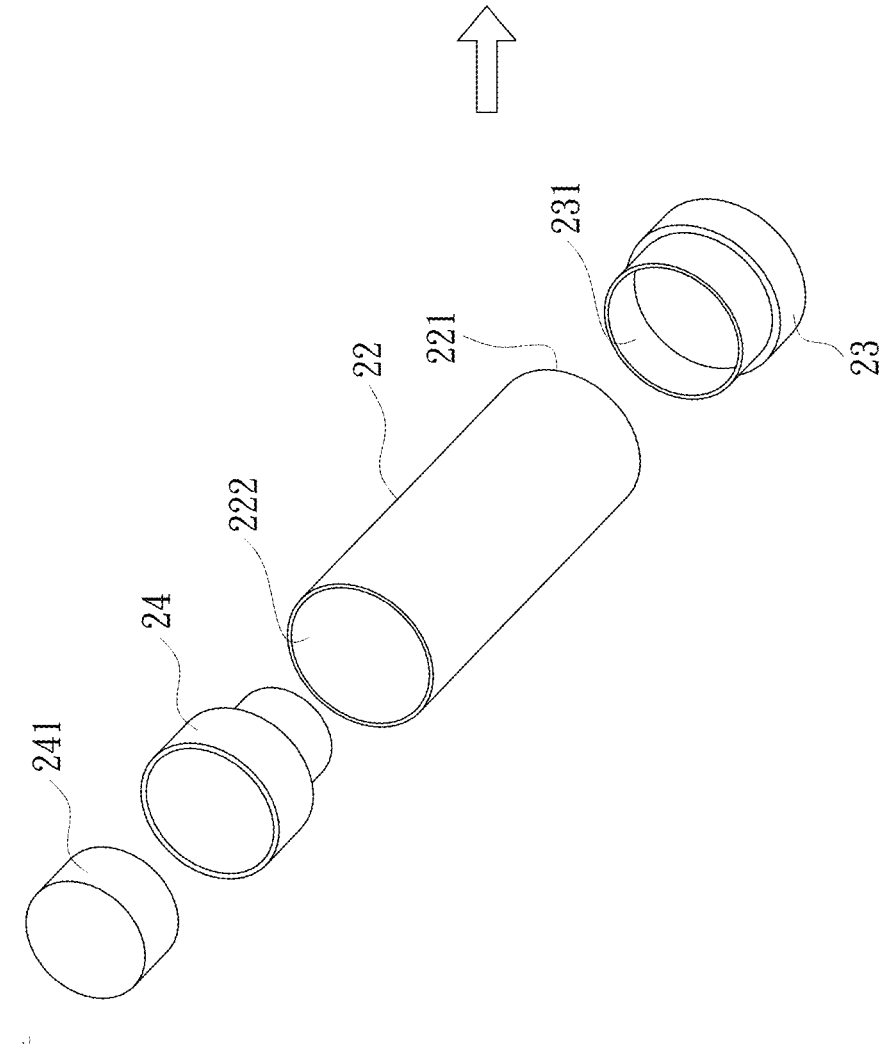

As shown in FIG. 2, FIG. 2 is a schematic diagram of a culture tube provided by an embodiment of the present invention. The culture tube 21 provided by the embodiment includes a tube body 22 and lids 23 and 24 made from a transparent material. The target organisms being the fruit flies T and the culture tubes 21 being cylindrical are taken as an example, but the present invention is not limited thereto. One end of the tube body 22 of the culture tube 21 is provided with an opening 221, and the lid 23 is sleeved at the opening 221; and the other end of the tube body 22 is also provided with an opening 222, and the lid 24 is sleeved at the opening 222, wherein the lid 24 includes an air permeable plug 241. A place of the lid 23 corresponding to the tube body 22 is provided with a depressed portion which is filled with a substance 231 (in a solid colloid form) which can be digested by the fruit flies T, and is used for the fruit flies T to lay eggs and for larvae T' to lodge.

Figure 3:
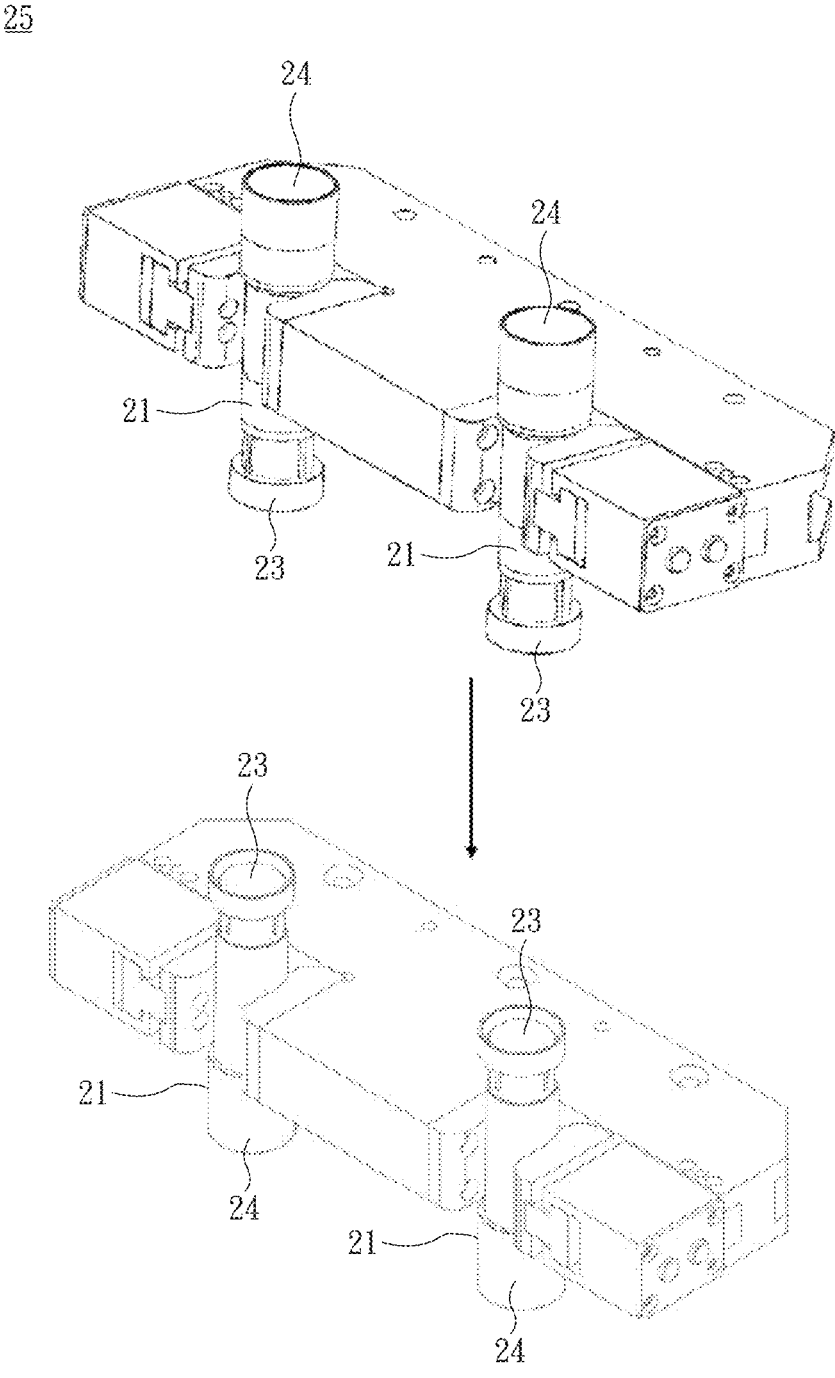
FIG. 3 is a schematic diagram of a turning structure in an exchange module provided by an embodiment of the present invention.
Figure 4:
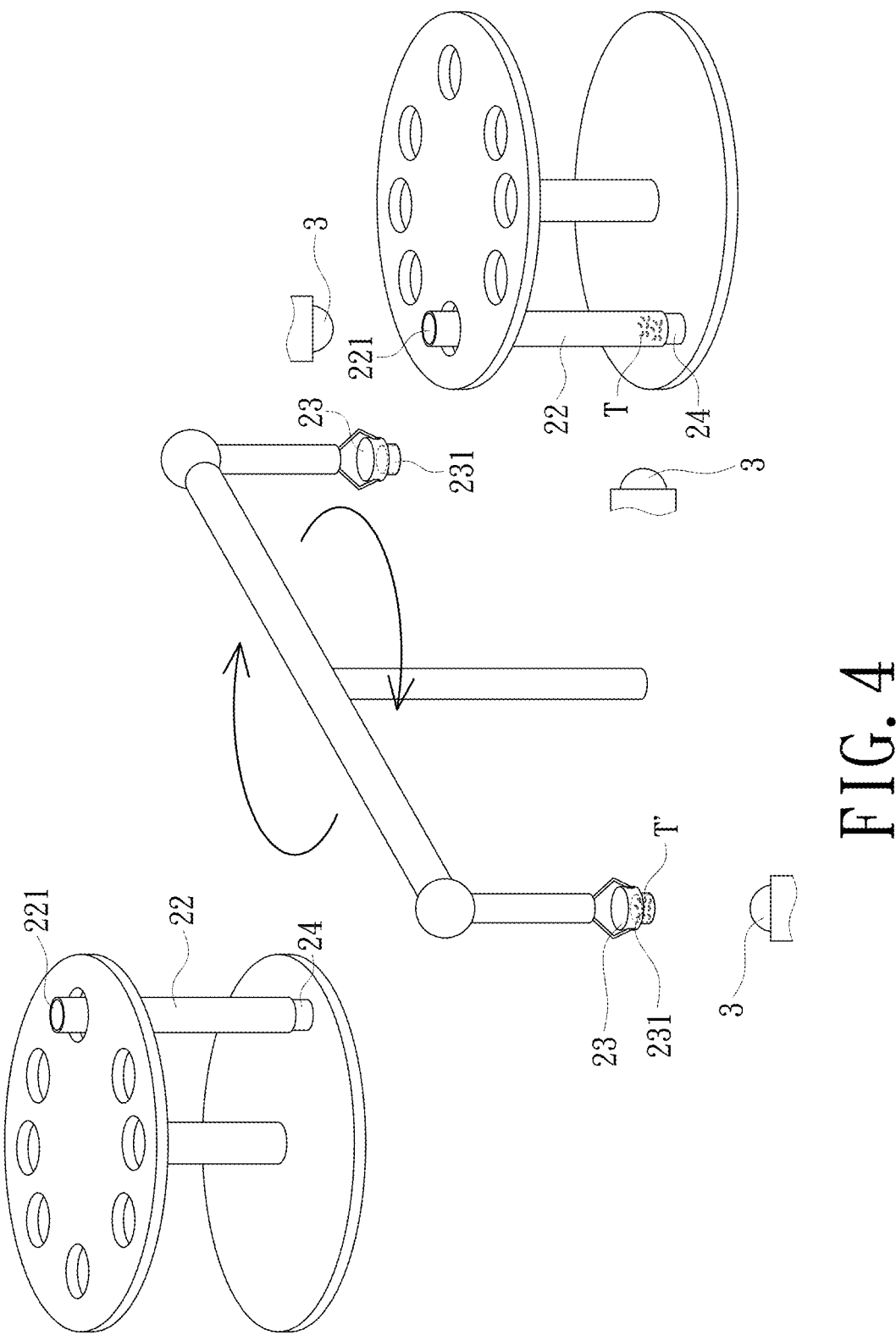
FIG. 4 is a schematic diagram of an exchange structure in the exchange module provided by an embodiment of the present invention.

As shown in FIG. 3 and FIG. 4, FIG. 3 is a schematic diagram of a turning structure in an exchange module provided by an embodiment of the present invention, and FIG. 4 is a schematic diagram of an exchange structure in the exchange module provided by an embodiment of the present invention. The turning structure 25 in the exchange module 2 provided by the embodiment is configured to turn the culture tube 21 clockwise or anticlockwise and to make the culture tube turn upside down and make the opening 221 face upwards, and the exchange structure 26 in the exchange module 2 is configured to replace the tube body 22 or the lid 23 of the culture tube 21. In addition, before the tube body 22 or the lid 23 of the culture tube 21 is replaced by the exchange module 2, the biological numerical monitoring and feature identification analysis system 1 will pierce the air permeable plug 241 with an anesthetic needle to inject an anesthetic gas such as carbon dioxide into the culture tube 21 to cause transient coma of the fruit flies T; then the exchange module 2 separates the tube body 22 of the culture tube 21 from the lid 23, and the separated tube body 22 or lid 23 are rotated clockwise or anticlockwise to be away from each other so as to replace the tube body 22 and the lid 23 of another new culture tube 21, so that the tube body 22 of the old culture tube 21 and the lid 23 of the new culture tube 21 are combined, the lid 23 of the old culture tube 21 and the tube body 22 of the new culture tube 21 are combined, and the combined new and old culture tubes 21 are turned. It can be noted that the means to turn the culture tube 21 by the turning structure 25 in the exchange module 2 can be as follows: a clamp clamps the culture tube 21 to turn the culture tube up and down or other devices capable of executing the function of turning the culture tube 21 up and down are used, but the turning means is not limited herein. Moreover, the way to separate and combine the tube body 22 and the lid 23 of the combined culture tube 21 by the exchange structure 26 in the exchange module 2 can be as follows: upper and lower clamps respectively clamp the tube body 22 and the lid 23 to separate and combine or devices capable of executing the function of separating and combining the tube body 22 and the lid 23 can be used, but the separating and combining means is not limited herein. In addition, the objective of replacing the tube bodies 22 and the lids 23 of the new and old culture tubes 21 by the exchange module 2 is to respectively provide a new substance which can be digested by the fruit flies T, and the lid is used for the fruit flies to lay eggs and hatch the eggs and for larvae T' to survive. Finally, it shall be noted that the modules, devices and the culture tubes and their sizes and positions in FIG. 3 and FIG. 4 are merely illustrative for executing corresponding actions rather than limiting the present invention.

In the embodiment, the plurality of shooting modules 3 include a first shooting module 3, a second shooting module 3 and a third shooting module 3. The first shooting module 3 is arranged above the position of the tube body 22 of the turned old culture tube 21 to shoot an image from top to bottom. The second shooting module 3 is arranged on a path of the lid 23 of the turned old culture tube 21 rotating in a clockwise direction or an anticlockwise direction to shoot an image from bottom to top. The third shooting module 3 is arranged at a side edge of the position of the tube body 22 of the turned old culture tube 21 or at a side edge of the position of the tube body 22 of the combined old culture tube 21 to shoot an image from an outer side to an inner side of the tube body 22. It can be noted that the way to set the positions of the shooting modules 3 can be as follows: the shooting modules are supported by a bracket or other devices capable of supporting the shooting modules 3 are used, but the supporting means is not limited herein.

In another embodiment, the second shooting module 3 is arranged on a path of the tube body 22 of the turned old culture tube 21 rotating in a clockwise direction or an anticlockwise direction to shoot an image from top to bottom. The second shooting module 3 is arranged below the position of the lid 23 of the turned old culture tube 21 to shoot an image from bottom to top. The third shooting module 3 is arranged at a side edge of the position of the tube body 22 of the turned old culture tube 21 or at a side edge of the position of the tube body 22 of the combined old culture tube 21 to shoot an image from an outer side to an inner side of the tube body 22. It can be noted that the way to set the positions of the shooting modules 3 can be as follows: the shooting modules are supported by a bracket or other devices capable of supporting the shooting modules 3 are used, but the supporting means is not limited herein.

In the embodiment, a condition judgment module 4 receives three images from the first shooting module 3, the second shooting module 3 and the third shooting module 3, and identifies related features of the target organism in the tube body from the image originated from the first shooting module 3, the related features including, but not limited to, a number of imagoes, genders, colors, features and the number of parasites of the fruit flies T; identifies related features of the target organism in the lid 23 from the image originated from the second shooting module 3, the related features including, but not limited to, a number of imagoes (or larvae T') of the target organism, larvae or not, smoothness of food of the substance which can be digested, degrees of discoloration of food of the substance which can be digested and the number of parasites; and identifies related features of the target organism on the inner side tube wall of the tube body 22 from the image originated from the second shooting module 3, the related features including, but not limited to, features and a dynamic state (such as moving speed) of the fruit flies T, colors of imagoes (or larvae T'), colors of pupae, the number of imagoes, and the number of parasites. Then, the condition judgment module 4 can judge the health degree of the fruit flies in the culture tube 21 according to a feature judgment condition of the target organism in a remote or built-in database. It can be noted from above that the related features of the target organism at least include, but not limited to, the above mentioned features, and the related features of the target organism identified in each image can also be identified in other images.

The feature judgment condition of the target organism is as follows: for example, the number of imagoes of the fruit flies T is judged to ensure continuation of the fruit fly variety, i.e., a next generation cannot be continued when the condition judgment module 4 judges that the number of imagoes of the fruit flies T is only one of the fruit flies; for example, the genders of the fruit flies T are judged to ensure continuation of the fruit fly variety, i.e., a next generation cannot be continued when the condition judgment module 4 judges that the gender of the fruit flies T is only a single gender; for example, the features of the fruit flies are judged to ensure the purity of the variety, such as the color of eyes of the fruit flies, the length of body hairs, the crimpness of wings, the fluorescence color or the sizes of the fruit flies; for example, the colors of the larvae and pupae of the fruit flies T are judged to ensure continuation of the fruit fly variety, i.e., the fruit flies are block as they cannot be subjected to eclosion normally when the condition judgment module 4 judges that the fruit flies T are injected with viruses or bacteria; for example, the smooth degree of food of the substance which can be digested by the larvae T' of the fruit flies is judged to ensure whether the fruit flies have a next generation, i.e., the condition judgment module 4 judges that the surface of the food is pasty rather than solid colloidal, since the larvae of the fruit flies will degrade the food when there are larvae of the fruit flies are successfully hatched, so that the food is pasty; for example, the discoloration degree of the food of the substance which can be digested by the fruit flies T is judged, i.e., whether the discoloration degree of the food of the substance which can be digested by the fruit flies T is infected with bacteria and moulds is judged by the condition judgment module 4; and for example, the number of parasites in the culture tube 21 is judged to prevent the fruit flies from being parasitized, i.e., the culture tube 21 has to be disposed immediately when the condition judgment module 4 judges that there are parasites.

As shown in FIG. 5, FIG. 5 is a flowchart of a biological numerical monitoring and feature identification analysis method provided by an embodiment of the present invention. The biological numerical monitoring and feature identification analysis method provided by the present invention is executed by the biological numerical monitoring and feature identification analysis system 1. To be precise, the biological numerical monitoring and feature identification analysis method is executed by a control device 5. The method includes the following steps: S1: turning, by the exchange module 2, the old culture tube 21 to make a first opening 221 of the tube body 22 face upwards, separating the tube body 22 from the lid 23, and rotating the separated tube body 22 or the lid 23 in a clockwise direction or an anticlockwise direction, wherein the tube body and the lid are away from each other; S3: shooting, by the first shooting module 3, the lid 24 connected to the tube body 22 in the old culture tube 21 from top to bottom to acquire the first image; S5: shooting, by the second shooting module 3, the lid 23 separated from the tube body 22 in the old culture tube 21 from bottom to top to acquire the second image; S7: shooting, by the third shooting module 3, the tube body 22 from the outer side to the inner side of the tube body 22 to acquire the third image; S9: exchanging, by the exchange module 2, the lid 23 of the old culture tube 21 with the lid 23 of the new culture tube 21, or exchanging the tube body 22 of the old culture tube 21 with the tube body 22 of the new culture tube 21; S11: combining, by the exchange module 2, the tube body 22 of the old culture tube 21 with the lid 23 of the new culture tube 21, and the lid 23 of the old culture tube 21 with the tube body 22 of the new culture tube 21, and turning the exchanged old culture tube 21 and new culture tube 21; and S13: receiving, by the condition judgment module 4, the first image, the second image and the third image to identify the plurality of first features, the plurality of second features and the plurality of third features of the target organism, and judging the health degree of the target organism in the old culture tube 21 according to the first features, the second features and the third features of the target organism. In addition, it can be noted that S13 is executed after S3, S5 and S7, so that S13 is not limited to be executed after S9 and S11. Finally, the function of each step executed by the biological numerical monitoring and feature identification analysis method provided by the present invention is the same as the mentioned in the previous embodiment, which is not described repeatedly herein.

An embodiment of the present invention provides a method for analyzing lives of fruit flies, wherein a predetermined quantity of fruit fly imagoes are placed in a single culture tube and the placed fruit fly imagoes are same in gender (male or female), so that next generation of the fruit flies will not be generated. In addition, the culture tube can be renewed within a fixed period till all the fruit flies are dead. Images can be acquired for image analysis for the fruit flies through the technical solution in the abovementioned embodiment. The embodiment is applicable to scopes of drug screening, drug toxicity test and the like, and the accuracy of the experiment is improved by screening the genders of the fruit flies because the quantity of the fruit flies is properly controlled without generating next generation of the fruit flies.

In conclusion, by appropriately adopting the shooting modules in the exchange system to monitor the health condition of the fruit flies, the biological numerical monitoring and feature identification analysis system and a method thereof provided by the present invention can monitor the health condition of the fruit flies in all the tube bottles, so as to lower the manpower and the time cost, and avoid erroneous judgment.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A biological numerical monitoring and feature identification analysis method, executed by a biological numerical monitoring and feature identification analysis system, comprising:

shooting, by a first shooting module, a first lid connected to a tube body in a first culture tube from top to bottom to acquire a first image;

shooting, by a second shooting module, a second lid separated from the tube body in the first culture tube from bottom to top to acquire a second image;

receiving, by a condition judgment module, the first image and the second image to respectively identify a plurality of first features and a plurality of second features of a target organism, and judging a health degree of the target organism in the first culture tube according to the first features and the second features of the target organism; and turning, by an exchange module, the first culture tube to make a first opening of the tube body face upwards, separating the tube body from the second lid, and rotating the separated tube body or the second lid in a clockwise direction or an anticlockwise direction, wherein the tube body and the second lid are away from each other;

wherein the second lid is sleeved at the first opening;

wherein the first shooting module is located above a position of the turned first lid, and the second shooting module is located in a path of the turned second lid rotating in the clockwise direction or the anticlockwise direction.

2. The biological numerical monitoring and feature identification analysis method according to claim 1, wherein the first shooting module is located in a path of the turned first lid rotating in the clockwise direction or the anticlockwise direction, and the second shooting module is located below a position of the turned second lid.

3. The biological numerical monitoring and feature identification analysis method according to claim 1, further comprising:

exchanging, by the exchange module, the second lid of the first culture tube with a second lid of a second culture tube, or exchanging the tube body and the first lid of the first culture tube with a tube body and a first lid of the second culture tube.

4. The biological numerical monitoring and feature identification analysis method according to claim 3, further comprising:

combining, by the exchange module, the tube body of the first culture tube with the second lid of the second culture tube, and the second lid of the first culture tube with the tube body of the second culture tube, and turning the exchanged first culture tube and second culture tube.

5. The biological numerical monitoring and feature identification analysis method according to claim 1, further comprising:

shooting, by a third shooting module, the tube body from an outer side to an inner side of the tube body to acquire a third image; and receiving, by the condition judgment module, the third image to identify the plurality of third features of the target organism, and judging the health degree of the target organism in the first culture tube according to the first features, the second features and the third features of the target organism.

6. The biological numerical monitoring and feature identification analysis method according to claim 5, wherein the first features at least comprise a number of imagoes, genders, colors and features or the number of parasites of the target organism; the second features at least comprise a number of imagoes of the target organism, larvae or not, smoothness of food, degrees of discoloration of food or the number of parasites; and the third features at least include features and a dynamic state of the target mechanism, colors of imagoes, colors of pupae, the number of imagoes, larvae or not or the number of parasites.

7. A biological numerical monitoring and feature identification analysis system, comprising:

a first shooting module, configured to shoot a first lid connected to a tube body in a first culture tube from top to bottom to acquire a first image;

a second shooting module, configured to shoot a second lid separated from the tube body in the first culture tube from bottom to top to acquire a second image;

a condition judgment module, connected to the first shooting module and the second shooting module and configured to receive the first image and the second image to respectively identify a plurality of first features and a plurality of second features of a target organism, and to judge a health degree of the target organism in the first culture tube according to the first features and the second features of the target organism; and an exchange module, configured to turn the first culture tube to make a first opening of the tube body face upwards, to separate the tube body from the second lid, and to rotate the separated tube body or the second lid in a clockwise direction or an anticlockwise direction, wherein the tube body and the second lid are away from each other;

wherein the second lid is sleeved at the first opening;

wherein the first shooting module is located above a position of the turned first lid, and the second shooting module is located in a path of the turned second lid rotating in the clockwise direction or the anticlockwise direction.

8. The biological numerical monitoring and feature identification analysis system according to claim 7, wherein the first shooting module is located in a path of the turned first lid rotating in the clockwise direction or the anticlockwise direction, and the second shooting module is located below a position of the turned second lid.

9. The biological numerical monitoring and feature identification analysis system according to claim 7, wherein the exchange module exchanges the second lid of the first culture tube with a second lid of a second culture tube, or exchanges the tube body and the first lid of the first culture tube with a tube body and a first lid of the second culture tube.

10. The biological numerical monitoring and feature identification analysis system according to claim 9, wherein the exchange module combines the tube body of the first culture tube with the second lid of the second culture tube, and the second lid of the first culture tube with the tube body of the second culture tube, and turns the exchanged first culture tube and second culture tube.

11. The biological numerical monitoring and feature identification analysis system according to claim 7, further comprising:

a third shooting module, configured to shoot the tube body from an outer side to an inner side of the tube body to acquire a third image;

wherein the condition judgment module is connected to the third shooting module, and is configured to receive the third image to identify a plurality of third features of the target organism, and to judge the health degree of the target organism in the first culture tube according to the first features, the second features and the third features of the target organism.

12. The biological numerical monitoring and feature identification analysis system according to claim 11, wherein the first features at least comprise the number of imagoes, genders, colors and features of the target organism or the number of parasites; the second features at least include the number of imagoes of the target organism, larvae or not, smoothness of food, degrees of discoloration of food or the number of parasites; and the third features at least include features and a dynamic state of the target mechanism, colors of imagoes, colors of pupae, the number of imagoes, larvae or not or the number of parasites.

* * * * *